United States Patent
Izumi et al.

(10) Patent No.: US 10,501,669 B2
(45) Date of Patent: *Dec. 10, 2019

(54) SUGAR ALCOHOL MICROCAPSULE, SLURRY, AND RESIN MOLDED ARTICLE

(71) Applicant: HITACHI CHEMICAL COMPANY, LTD., Tokyo (JP)

(72) Inventors: Hiroyuki Izumi, Tokyo (JP); Masato Miyatake, Tokyo (JP); Toshinori Makuta, Yonezawa (JP); Koutarou Kadoya, Yonezawa (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,452

(22) Filed: Oct. 17, 2017

(65) Prior Publication Data

US 2018/0037789 A1 Feb. 8, 2018

Related U.S. Application Data

(62) Division of application No. 15/118,816, filed as application No. PCT/JP2015/053835 on Feb. 12, 2015, now Pat. No. 9,822,293.

(30) Foreign Application Priority Data

Feb. 14, 2014 (JP) .................................. 2014-026456

(51) Int. Cl.
*C09K 5/06* (2006.01)
*C08G 18/76* (2006.01)
(Continued)

(52) U.S. Cl.
CPC ............... *C09K 5/063* (2013.01); *B01J 13/14* (2013.01); *C08G 18/3206* (2013.01);
(Continued)

(58) Field of Classification Search
CPC ............ C09K 5/063; B01J 13/14; B01J 13/16
See application file for complete search history.

(56) References Cited

U.S. PATENT DOCUMENTS 2,904,440 A * 9/1959 Dimick .................... A23L 27/70
426/429
9,822,293 B2 * 11/2017 Izumi ....................... B01J 13/14
(Continued)

FOREIGN PATENT DOCUMENTS

CN 102492397 A 6/2012
JP H10-324868 A 12/1998
(Continued)

OTHER PUBLICATIONS

International Search Report for PCT/JP2015/053835 dated Mar. 24, 2015; English Translation submitted herewith (3 Pages).
(Continued)

*Primary Examiner* — John R Hardee
(74) *Attorney, Agent, or Firm* — Fitch, Even, Tabin & Flannery, LLP (57) ABSTRACT

A sugar alcohol microcapsule obtained by mixing particles that include molten sugar alcohol and are dispersed in an oil phase with a material that reacts with the particles, and encapsulating the sugar alcohol.

6 Claims, 3 Drawing Sheets

(51) Int. Cl.
    *C08G 18/32*     (2006.01)
    *B01J 13/14*     (2006.01)
    *F28D 20/02*     (2006.01)

(52) U.S. Cl.
    CPC ..... *C08G 18/3228* (2013.01); *C08G 18/7671* (2013.01); *F28D 20/023* (2013.01); *Y02E 60/145* (2013.01)

(56) References Cited

U.S. PATENT DOCUMENTS

| | | |
|---|---|---|
| 2006/0263475 A1 | 11/2006 | Jani |
| 2007/0003663 A1 | 1/2007 | Jani |
| 2012/0156288 A1 | 6/2012 | Lakkis |

FOREIGN PATENT DOCUMENTS

| | | |
|---|---|---|
| JP | 2003-306672 A | 10/2003 |
| JP | 2007-238912 A | 9/2007 |
| JP | 2009-073985 A | 4/2009 |
| JP | 2010-024403 A | 2/2010 |

OTHER PUBLICATIONS

International Preliminary Report for WO Appln. No. PCT/JP2015/053835 dated Aug. 25, 2016 in English.

\* cited by examiner

SUGAR ALCOHOL MICROCAPSULE, SLURRY, AND RESIN MOLDED ARTICLE

CROSS-REFERENCE TO RELATED APPLICATIONS

This application is a divisional application of U.S. application Ser. No. 15/118,816 filed Aug. 12, 2016, which is a 371 of International Application No. PCT/JP2015/053835, filed Feb. 12, 2015, now U.S. Pat. No. 9,822,293, which claims priority to JP 2014-026456, filed Feb. 14, 2014, the contents of each of which are incorporated herein by reference.

TECHNICAL FIELD

The present invention relates to a sugar alcohol microcapsule, a slurry comprising the sugar alcohol microcapsule, and a resin molded article obtained by using the sugar alcohol microcapsule.

BACKGROUND ART

A latent heat storage material using absorption of heat and generation of heat occurring during a phase change of liquid-solid is known to be in a state of supercooling that maintains a molten state even if a temperature decreases to the melting point or less after the latent heat storage material is in the molten state once. Since it is possible to provide heat release according to the phase change by artificially releasing the state of supercooling, the use of the latent heat storage material grows as a material that allows switching of heat storage-heat release. In recent years, developments of a technique of microparticulating this latent heat storage material and thereafter encapsulating it to improve the speeds of heat release and heat storage, and a technique of suppressing coalescence when being molten to facilitate transporting and treating are underway.

Examples of a known method for producing a capsule including these phase-change materials include a technique of producing a microcapsule including the paraffins by the step of heating paraffins to a melting point or higher thereof, cooling a heat storage material emulsion obtained by performing emulsification and dispersion in an aqueous solution in a pressurization state, thereafter performing a reheating, and performing microencapsulation using a melamine-formaldehyde resin or a urea-formaldehyde resin as a coat according to an In-situ polymerizing method (for example, see Patent Literature 1 below), a technique of producing a heat storage microcapsule by using xylitol that stores heat or releases heat according to a phase change as a core substance, and covering the core substance with an aramid resin (for example, see Patent Literature 2 below), and a technique of producing a heat storage microcapsule by microparticulating an aqueous solution of a core substance using a dispersion film, and causing a reaction with isocyanate (for example, see Patent Literature 3 below).

CITATION LIST

Patent Literature

Patent Literature 1: Japanese Unexamined Patent Publication No. 2003-306672
Patent Literature 2: Japanese Unexamined Patent Publication No. 2007-238912
Patent Literature 3: Japanese Unexamined Patent Publication No. 2009-73985

SUMMARY OF INVENTION

Technical Problem

In the technique shown in Patent Literature 1, the microcapsule composed of the paraffins as the heat storage material and melamine-formaldehyde as the film material is shown as a material suitable for architectural materials. However, since paraffins have a low heat storage density, there is a problem that the volume of the heat storage material used for a heat storage mechanism is enormous, and it is unsuitable for use in a small space, which causes restricted application.

Patent Literature 2 provides an improvement in an amount of heat storage by using xylitol as the heat storage material. However, the amount of heat storage of the microcapsule is 182 kJ/L, as compared with 257 kJ/L of the amount of heat storage of xylitol as a raw material, and the content of the heat storage material is about 70% by mass, resulting in a low heat storage density.

Furthermore, Patent Literatures 2 and 3 use a heat storage material aqueous solution when producing the heat storage material capsule in common. For this reason, since a large amount of moisture is contained in the core substance after the encapsulation, the moisture is gradually vaporized from about 80° C., and the capsule is damaged by the volume expansion due to water vapor generation for use under an environment of 100° C. or higher.

The present invention is intended to solve the problems relating to the conventional techniques, and it is an object of the present invention to provide a sugar alcohol microcapsule having an excellent heat storage density and containing a small amount of moisture, a slurry comprising the sugar alcohol microcapsule, and a resin molded article obtained by using the sugar alcohol microcapsule.

Solution to Problem

As a result of an intensive study to solve the above problems, the present inventors found that, by mixing particles that include molten sugar alcohol and are dispersed in an oil phase with a material that reacts with the particles, and encapsulating the sugar alcohol, it is possible to easily perform microencapsulation in a short time while solving the problems.

A sugar alcohol microcapsule according to the present invention is obtained by mixing particles that include molten sugar alcohol and are dispersed in an oil phase with a material that reacts with the particles, and encapsulating the sugar alcohol.

The sugar alcohol microcapsule according to the present invention has an excellent heat storage density. Since the sugar alcohol microcapsule according to the present invention is obtained by the reaction in the molten state, it is possible to reduce the amount of moisture in a core substance, and an amount of moisture is small. Thus, the small amount of moisture makes it possible to prevent the capsule from being damaged by the volume expansion of water vapor generation even in use under an environment of 100° C. or higher.

According to Examples of Patent Literature 2, at least 26 hours are required as a reaction time and it takes a long time for the production of the microcapsule, and therefore, a problem in achieving mass production remains. On the other hand, according to the present invention, particles having a small particle size (for example, 100 μm or less) containing a sugar alcohol as the core substance can be produced in a large amount and in a short time (for example, 1 hour or less), which can easily provide the microcapsule in a short time.

The amount of moisture contained in the sugar alcohol microcapsule according to the present invention is preferably less than 1% by mass based on the total of the capsule. In this case, it is easy to prevent the capsule from being damaged even in use under an environment of 100° C. or higher.

The material that reacts with the particles is preferably at least one selected from the group consisting of a cyanoacrylate compound, a cyanate compound, an isocyanate compound, and a carboxylic halide.

The particles may further contain at least one selected from the group consisting of an amine compound and a water-soluble epoxy compound.

The average particle diameter of the sugar alcohol microcapsule according to the present invention is preferably 100 μm or less.

The particles are preferably dispersed in the oil phase using an ultrasonic homogenizer.

A slurry according to the present invention comprises the sugar alcohol microcapsule. A resin molded article according to the present invention is produced using the sugar alcohol microcapsule.

Advantageous Effects of Invention

According to the present invention, it is possible to obtain a sugar alcohol microcapsule having an excellent heat storage density and containing a small amount of moisture. According to the present invention, it is also possible to easily produce the sugar alcohol microcapsule in a short time.

DESCRIPTION OF EMBODIMENTS

Hereinafter, a sugar alcohol microcapsule (sugar alcohol-containing microcapsule) according to one embodiment of the present invention, method for producing the same, a slurry comprising the sugar alcohol microcapsule, a method for producing the same, a resin molded article obtained by using the sugar alcohol microcapsule, and a method for producing the same will be described.

[Sugar Alcohol Microcapsule and Method for Producing the Same]

According to the method for producing a sugar alcohol microcapsule according to the present embodiment, a sugar alcohol microcapsule is obtained by mixing particles that include molten (melt) sugar alcohol and are dispersed in an oil phase with a material that reacts with the particles, and encapsulating the sugar alcohol. The sugar alcohol microcapsule according to the present embodiment is obtained by mixing particles that include molten sugar alcohol and are dispersed in an oil phase with a material that reacts with the particles, and encapsulating the sugar alcohol.

In the method for producing a sugar alcohol microcapsule according to the present embodiment, a material that can react with a sugar alcohol to encapsulate (for example, form a film) may be used, for example, a sugar alcohol microcapsule may be obtained by mixing a molten sugar alcohol with a material that reacts with the sugar alcohol, and encapsulating the sugar alcohol. In this case, by bringing the sugar alcohol and the material that reacts with the sugar alcohol into contact with each other, for example, a film (covering layer) is formed on the surface of the sugar alcohol, and thereby the sugar alcohol is encapsulated.

The method for producing a sugar alcohol microcapsule according to the present embodiment may utilize a material that can react with a reaction component (component excluding the sugar alcohol, reactant additive) contained in the particles, other than the sugar alcohol, to encapsulate (for example, form a film), for example, a sugar alcohol microcapsule may be obtained by mixing particles containing sugar alcohol and the reaction component with a material that reacts with the reaction component, and encapsulating the sugar alcohol. In this case, by bringing the above-mentioned reaction component and the material that reacts with the reaction component into contact with each other, for example, a film (covering layer) is formed on the surface of the sugar alcohol, and thereby the sugar alcohol is encapsulated.

The method for producing a sugar alcohol capsule according to the present embodiment preferably comprises a microparticulating step of microparticulating particles, containing a sugar alcohol that is a molten state at a temperature equal to or higher than a melting point, in an oil phase before mixing particles dispersed in the oil phase with a material that reacts with the particles. For example, it is preferable to microparticulate a melt of sugar alcohol in an oil phase, and thereafter, for example, to form a film on the surface of the fine particles to encapsulate the sugar alcohol, thereby producing a sugar alcohol microcapsule. Thereby, it is possible to more easily perform microencapsulation in a short time. In such a case, it is possible to continuously advance microparticulation and encapsulation in one batch without requiring a purifying step after the microparticulating step.

Patent Literature 3 causes water to react with isocyanate using an aqueous solution as a core substance, to achieve microparticulation and encapsulation. However, from the results of a filter treatment after the reaction and particle size distribution, the generated microcapsule is anticipated to have a non-spherical shape, and is considered to have a mechanical strength lower than that of a spherical capsule. On the other hand, in the present embodiment, it is possible to obtain spherical fine particles by microparticulating the particles containing the sugar alcohol in the oil phase, which makes it possible to obtain a capsule having a high mechanical strength. In the present embodiment, it is easy to decrease the average particle diameter of the fine particles by microparticulating the particles containing the sugar alcohol in the oil phase. Thereby, it is easy to obtain a capsule having a high mechanical strength.

Figure 1:
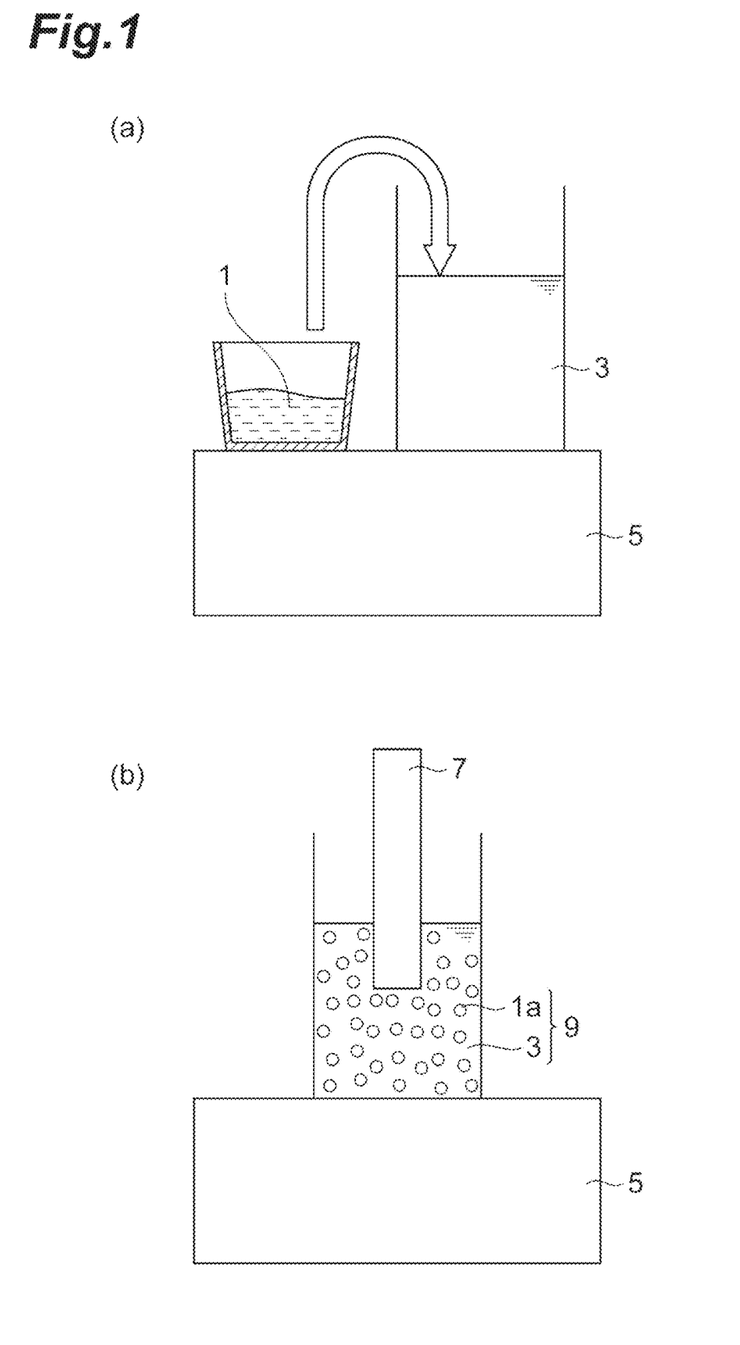
FIG. 1 is a drawing for describing a method for producing a sugar alcohol microcapsule according to one embodiment of the present invention.

Hereinafter, the present embodiment will be described with reference to FIG. 1. The method for producing a sugar alcohol microcapsule according to the present embodiment comprises a melt dispersing step and a mixing step, for example. In the melt dispersing step, for example, as shown in FIG. 1(a), a melt 1 of a sugar alcohol and a dispersion medium 3 as an oil phase are prepared. In this case, the temperatures of the sugar alcohol and the dispersion medium 3 are raised to the melting point or higher of the sugar alcohol by heating means 5, and thereby the melt 1 of the sugar alcohol is obtained.

Next, the melt 1 and the dispersion medium 3 are mixed to obtain a mixed solution in which particles containing a molten sugar alcohol (hereinafter, referred to as "sugar alcohol particles") are dispersed in the dispersion medium 3. In this case, for example, as shown in FIG. 1(b), the sugar alcohol particles in the mixed solution are microparticulated using microparticulating means 7 to obtain a mixed solution 9 containing sugar alcohol fine particles 1a dispersed in the dispersion medium 3.

In the mixing step, as shown in FIG. 2(a), a film formation material 13 is dispersed or dissolved in a liquid 15 using dispersing means 11 to obtain a liquid containing the film formation material 13. The mixed solution 9 and the liquid containing the film formation material 13 are mixed. Thereby, as shown in FIG. 2(b), a film is formed on the surface of the sugar alcohol fine particles 1a, to generate a sugar alcohol microcapsule 17.

The sugar alcohol is mainly a compound generated by reducing a carbonyl group of aldose or ketose. Specific examples of the sugar alcohol include glycerin, erythritol, threitol, xylitol, arabinitol, ribitol, iditol, sorbitol, mannitol, galactitol, inositol, and pentaerythritol. Among these, from the viewpoints of a superior heat storage density, high safety, and easy availability, at least one selected from the group consisting of xylitol, erythritol, mannitol, and threitol is preferable.

The sugar alcohol is a heat storage material having a latent heat storage effect, and may be used alone or as a mixture of two or more in consideration of a usage temperature or the adjustment of a melting point, or the like.

The sugar alcohol particles may further contain at least one selected from the group consisting of an amine compound and a water-soluble epoxy compound. Also in this case, by mixing the mixed solution containing the sugar alcohol particles with the liquid containing the film formation material, for example, a film is formed on the surface of the sugar alcohol particles, and thereby a sugar alcohol microcapsule is generated.

From the viewpoint of easily suppressing the coalescence of the microparticulated droplets after the microparticulation treatment, the content of the sugar alcohol in the melt dispersing step is preferably 20 parts by mass or less, more preferably 10 parts by mass or less, and particularly preferably 1 part by mass or less based on 100 parts by mass of a dispersion medium as an oil phase. From the viewpoint that the microparticulated droplets can be efficiently collected, the content of the sugar alcohol in the melt dispersing step is 0.01 parts by mass or more, more preferably 0.05 parts by mass or more based on 100 parts by mass of a dispersion medium as an oil phase. From these viewpoints, the content of the sugar alcohol in the melt dispersing step is preferably 0.01 to 20 parts by mass or less, more preferably 0.01 to 10 parts by mass, and particularly preferably 0.05 to 1 parts by mass based on 100 parts by mass of a dispersion medium as an oil phase.

When molten substances are solidified, since many substances cause a supercooling phenomenon in which the substances are solidified at a temperature lower than a substance-specific melting point, the control of a solidifying temperature may be required for a material for heat storage uses. The sugar alcohol particles may contain a supercooling preventing agent. The supercooling preventing agent may be used alone or as a mixture of two or more.

Examples of the supercooling preventing agent include inorganic salts, a metal oxide, a metal, and an organic substance. Specific examples of the inorganic salts include sodium chloride, magnesium chloride, potassium chloride, potassium bromide, magnesium chloride, sodium carbonate, and borax. Examples of the metal oxide include copper oxide, silver oxide, zinc oxide, nickel oxide, alumina, titanium oxide, silica, and zirconia. Examples of the metal include platinum, gold, silver, palladium, iridium, ruthenium, and nickel. Examples of the organic substance include mannitol and pentaerythritol. Among these, from the viewpoint of being capable of being uniformly dispersed in the heat storage material, at least one selected from the group consisting of mannitol and pentaerythritol is preferable as a compound having a melting point close to the melting temperature of the sugar alcohol as the heat storage material (namely, a compound having a melting point wherein a difference in temperature with respect to the melting point of the sugar alcohol is about 50° C.).

The content of the supercooling preventing agent is preferably 0.01 to 10 parts by mass based on 100 parts by mass of the sugar alcohol as the heat storage material. When the content is 0.01 parts by mass or more, a supercooling preventing effect is easily exhibited. When the content is 10 parts by mass or less, the content of the heat storage material (namely, heat storage density) is easily satisfied.

The amine compound mixed with the sugar alcohol is not particularly limited as long as the amine compound contains one or more amino groups, does not react with the sugar alcohol, and is dissolved in the sugar alcohol. Examples of the amine compound include monoamines and polyvalent amines. Specific examples of the monoamines include aliphatic amines such as methylamine, ethylamine, butylamine, and hexylamine; and aromatic amines such as aniline, toluidine, and anisidine. Examples of the polyvalent amines include ethylenediamine, diaminobutane, hexamethylendiamine, p-phenylenediamine, and 4,4'-diaminodiphenyl ether. The amine compound is preferably at least one selected from the group consisting of butylamine, hexylamine, aniline, toluidine, ethylenediamine, diaminobutane, and hexamethylendiamine from the viewpoint of excellent dispersibility in the sugar alcohol since the amine compound is a liquid at the melting temperature of the sugar alcohol, and more preferably at least one selected from the group consisting of diaminobutane and hexamethylendiamine from the viewpoints of being capable of forming a cross-linked structure and allowing the film thickness control of a film formed on the surface of the sugar alcohol.

When using the amine compound, the content of the amine compound is preferably 0.001 to 50 parts by mass based on 100 parts by mass of the sugar alcohol. When the content is 0.001 parts by mass or more, it is easy to secure the strength of the film without excessively decreasing the film thickness of the film formed on the surface of the sugar alcohol. When the content is 50 parts by mass or less, it is easy to satisfy the heat storage density.

The water-soluble epoxy compound mixed with the sugar alcohol is not particularly limited as long as the water-soluble epoxy compound contains one or more epoxy groups, does not react with the sugar alcohol, and is dissolved in the sugar alcohol. Specific examples of the water-soluble epoxy compound include a bisphenol A type water-soluble epoxy resin, a bisphenol F type water-soluble epoxy resin, propylene glycol diglycidyl ether, diethylene glycol diglycidyl ether, polyethylene glycol diglycidyl ether, glycerol polyglycidyl ether, polyglycerol polyglycidyl ether, and sorbitol-based polyglycidyl ether. These are in a liquid form, and have excellent dispersibility in the sugar alcohol, which are suitable for being mixed with the sugar alcohol.

When using the water-soluble epoxy compound, the content of the water-soluble epoxy compound is preferably 0.001 to 50 parts by mass based on 100 parts by mass of the sugar alcohol. When the content is 0.001 parts by mass or more, it is easy to secure the strength of the film without excessively decreasing the film thickness of the film formed on the surface of the sugar alcohol. When the content is 50 parts by mass or less, it is easy to satisfy the heat storage density.

The dispersion medium 3 dispersing the sugar alcohol particles is not particularly limited as long as the dispersion medium 3 is an oil phase, does not dissolve the sugar alcohol, and maintains a liquid state even at the melting point or higher of the sugar alcohol. Examples of the dispersion medium include toluene, xylene, solvent naphtha, n-hexane, isohexane, cyclohexane, methyl cyclohexane, n-heptane, isooctane, n-decane, a silicone oil, and liquid paraffin. The dispersion medium is preferably at least one selected from the group consisting of a silicone oil and liquid paraffin as a dispersion medium that is a high-viscosity solvent from the viewpoint of excellent dispersibility, and more preferably a silicone oil having a specific weight close to that of the sugar alcohol.

In the present embodiment, it is possible to use a viscosity modifier for the purpose of maintaining the dispersion of the droplets of the melt (for example, microparticulated droplets). For example, the dispersion medium contains the viscosity modifier. Examples of the viscosity modifier include polyvinyl alcohol, propylene glycol, carboxymethyl cellulose, pectin, xanthan gum, and carrageenan. The viscosity modifier may be used alone or in combination of two or more.

Regardless of the presence or absence of the addition of the viscosity modifier, the kinetic viscosity of the dispersion medium is preferably 10 to 5000 mm$^2$/s, and more preferably 50 to 1000 mm$^2$/s at the melting temperature of the sugar alcohol as the heat storage material. When the kinetic viscosity is 10 mm$^2$/s or more, the heat storage material is less likely to settle out, and the dispersion of the droplets (for example, microparticulated droplets) each other can be maintained, which provide an improvement in a dispersion efficiency (for example, microparticulation efficiency). When the kinetic viscosity is 5000 mm$^2$/s or less, it is possible to recover and reuse the dispersion medium.

In order to finely disperse the sugar alcohol, the dispersion medium may contain a surfactant. Examples of the surfactant include, but are not particularly limited to, various known nonionic surfactants, cationic surfactants, anionic surfactants, and zwitterionic surfactants. The surfactant may be used alone or in combination of two or more.

Specific examples of the nonionic surfactant include a sorbitan fatty acid ester, a sucrose fatty acid ester, a polyoxyethylene fatty acid ester, a polyoxyethylene sorbitan fatty acid ester, polyoxyethylene alkyl ether, and polyoxy alkylphenyl ether. Examples of the cationic surfactant include an alkyltrimethylammonium salt, a dialkyldimethylammonium salt, an alkyldimethylbenzylammonium salt, and a benzyltrimethylammonium salt. Examples of the anionic surfactant include a higher fatty acid salt, an α-sulfo fatty acid methyl ester salt, a linear alkylbenzene sulfonate ester salt, an alkyl ether sulfate ester salt, a monoalkyl phosphate ester salt, an α-olefin sulfonic acid salt, and an alkane sulfonic acid salt. Examples of the zwitterionic surfactant include an alkylamino fatty acid salt, alkylbetaine, and alkylamine oxide. Examples of the ammonium salt include ammonium chloride.

The film formation material is preferably hydrophobic. The hydrophobic film formation material is not particularly limited as long as the hydrophobic film formation material is a compound that reacts with the sugar alcohol (for example, a compound having a functional group that directly reacts with the hydroxyl group of the sugar alcohol), or a compound that reacts with a component contained in the sugar alcohol particles.

Examples of the compound that reacts with the sugar alcohol include alcohol (excluding the sugar alcohol contained in the sugar alcohol particles), a phenol compound, a cyanoacrylate compound, a cyanate compound, an isocyanate compound, carboxylic acid, a carboxylic halide, and a carboxylic anhydride. Examples of the alcohol include methanol, ethanol, butanol, lauryl alcohol, ethylene glycol, and glycerin. Examples of the phenol compound include phenol, cresol, catechol, naphthol, and hydroquinone. Examples of the cyanoacrylate compound include 2-cyanoacrylate, ethyl-2-cyanoacrylate, allyloxyethyl-2-cyanoacrylate, fluoromethyl-2-cyanoacrylate, bis(2-cyanoacrylate), and trimethylsilylmethyl-2-cyanoacrylate. Examples of the cyanate compound include novolac type cyanate, bisphenol A type cyanate, and bisphenol F type cyanate. Examples of the isocyanate compound include methyl isocyanate, diphenylmethane diisocyanate, toluene diisocyanate, and hexamethylene diisocyanate. Examples of the carboxylic acid include acetic acid, butyric acid, stearic acid, oleic acid, linoleic acid, lactic acid, citric acid, benzoic acid, phthalic acid, terephthalic acid, salicylic acid, oxalic acid, succinic acid, adipic acid, fumaric acid, and maleic acid. Examples of the carboxylic halide include the chloride, bromide and iodide of the carboxylic acid. Examples of the carboxylic anhydride include the dehydrated condensate of the carboxylic acid. The compound that reacts with the sugar alcohol is preferably at least one selected from the group consisting of a cyanoacrylate compound, a cyanate compound, an isocyanate compound, and a carboxylic halide from the viewpoint of excellent chemical stability of the film to be formed. From the viewpoint that the film to be formed is polymerized to have excellent film strength, a compound having two or more functional groups is more preferable among a cyanoacrylate compound, a cyanate compound, an isocyanate compound, and a carboxylic halide. From the viewpoints of being inexpensive and easily treated, at least one selected from the group consisting of ethyl-2-cyanoacrylate and an isocyanate compound (for example, diphenylmethane diisocyanate, toluene diisocyanate, hexamethylene diisocyanate) is particularly preferable.

Examples of the component contained in the sugar alcohol particles include an amine compound, a water-soluble epoxy compound, and water contained in the sugar alcohol due to absorption of moisture. Examples of the compound that reacts with the component contained in the sugar alcohol particles include alcohol (excluding the sugar alcohol contained in the sugar alcohol particles), a phenol compound, an epoxy compound, an amine compound, a cyanoacrylate compound, a cyanate compound, an isocyanate compound, carboxylic acid, a carboxylic halide, and a carboxylic anhydride, and an alkyl halide.

Examples of the compound that reacts with the amine compound contained in the sugar alcohol particles include an epoxy compound (a bisphenol A type epoxy resin, a bisphenol F type epoxy resin, a bisphenol S type epoxy resin, a biphenyl type epoxy resin, a naphthalene type epoxy resin, glycidyl ether of the alcohol, glycidyl amine of the alcohol, glycidyl ester of the alcohol, or the like), the cyanate compound, the isocyanate compound, the carboxylic acid, the carboxylic halide, and the carboxylic anhydride. From viewpoint of excellent chemical stability of the film to be formed, at least one selected from the group consisting of an epoxy compound, an isocyanate compound, a carboxylic halide, and a carboxylic anhydride is preferable; from the viewpoint of excellent strength of the film to be formed, a compound capable of polymerizing the film is more preferable among an epoxy compound, an isocyanate compound, a carboxylic halide, and a carboxylic anhydride; and from the viewpoint of an excellent reaction rate, at least one selected from the group consisting of an epoxy compound, a carboxylic halide, and an isocyanate compound is particularly preferable.

Examples of the compound that reacts with the water-soluble epoxy compound contained in the sugar alcohol particles include an alkyl halide (for example, a compound obtained by substituting the hydroxyl group of the alcohol or the phenol compound by chlorine, bromine or iodine), the amine compound, the alcohol, the phenol compound, the isocyanate compound, the carboxylic acid, the carboxylic halide, and the carboxylic anhydride. From the viewpoint of excellent chemical stability of the film to be formed, at least one selected from the group consisting of an amine compound, a phenol compound, a carboxylic halide, and a carboxylic anhydride is preferable; from the viewpoint of excellent strength of the film to be formed, a compound capable of polymerizing the film is more preferable among a amine compound, a phenol compound, a carboxylic halide, and a carboxylic anhydride; and from the viewpoint of an excellent reaction rate, at least one selected from the group consisting of an amine compound, a phenol compound, and a carboxylic halide is particularly preferable.

Examples of the compound that reacts with water contained in the sugar alcohol particles include the cyanoacrylate compound, the cyanate compound, the isocyanate compound, and the epoxy compound. From the viewpoint of excellent chemical stability of the film to be formed, at least one selected from the group consisting of a cyanoacrylate compound and an isocyanate compound is preferable; and from the viewpoint of excellent strength of the film to be formed, a compound capable of polymerizing the film (specifically, 2-ethyl cyanoacrylate, diphenylmethane diisocyanate, toluene diisocyanate, hexamethylene diisocyanate or the like) is more preferable.

As the heating means 5, known heating means may be used, and examples thereof include an electric heating furnace, a water bath, an oil bath, a hot plate, and a mantle heater. The heating means is preferably a water bath, an oil bath, a hot plate, and a mantle heater from the viewpoint of easy temperature adjustment; and more preferably an oil bath, a hot plate, and a mantle heater from the viewpoint of a wide usable temperature range.

The microparticulating means 7 is not particularly limited as long as the melt 1 of the sugar alcohol that is present in a molten state in the dispersion medium can be made fine, and examples of the general method include a mixer, a magnetic stirrer, a colloid mill, a homomixer, an ultrasonic homogenizer, and a micro channel device. The microparticulating means is preferably a colloid mill, a homomixer, and an ultrasonic homogenizer from the viewpoint of an excellent size of a shearing force; and more preferably an ultrasonic homogenizer from the viewpoints of an excellent shape and diameter of the finished particle. When using the ultrasonic homogenizer, from the viewpoints of a further excellent shape and diameter of the particle, the output is preferably 10 W or more; and the application time is preferably 0.1 to 60 minutes, and more preferably 3 to 30 minutes.

The shapes of fine particles generated by the microparticulating means 7 may be any of a spherical shape, a spherical shape having a partial defect, and a non-spherical shape, and is preferably a spherical shape. Regarding the shape (size) of the fine particles, the value of the minimum diameter obtained under measurement so that a particle image observed with an optical microscope is sandwiched between parallel lines is preferably 70% or more of the value of the maximum diameter. The average particle diameter of the fine particles is 100 μm or less, for example, and can be measured with a laser light diffracting-scattering technique particle size distribution measuring device, for example.

Figure 2:
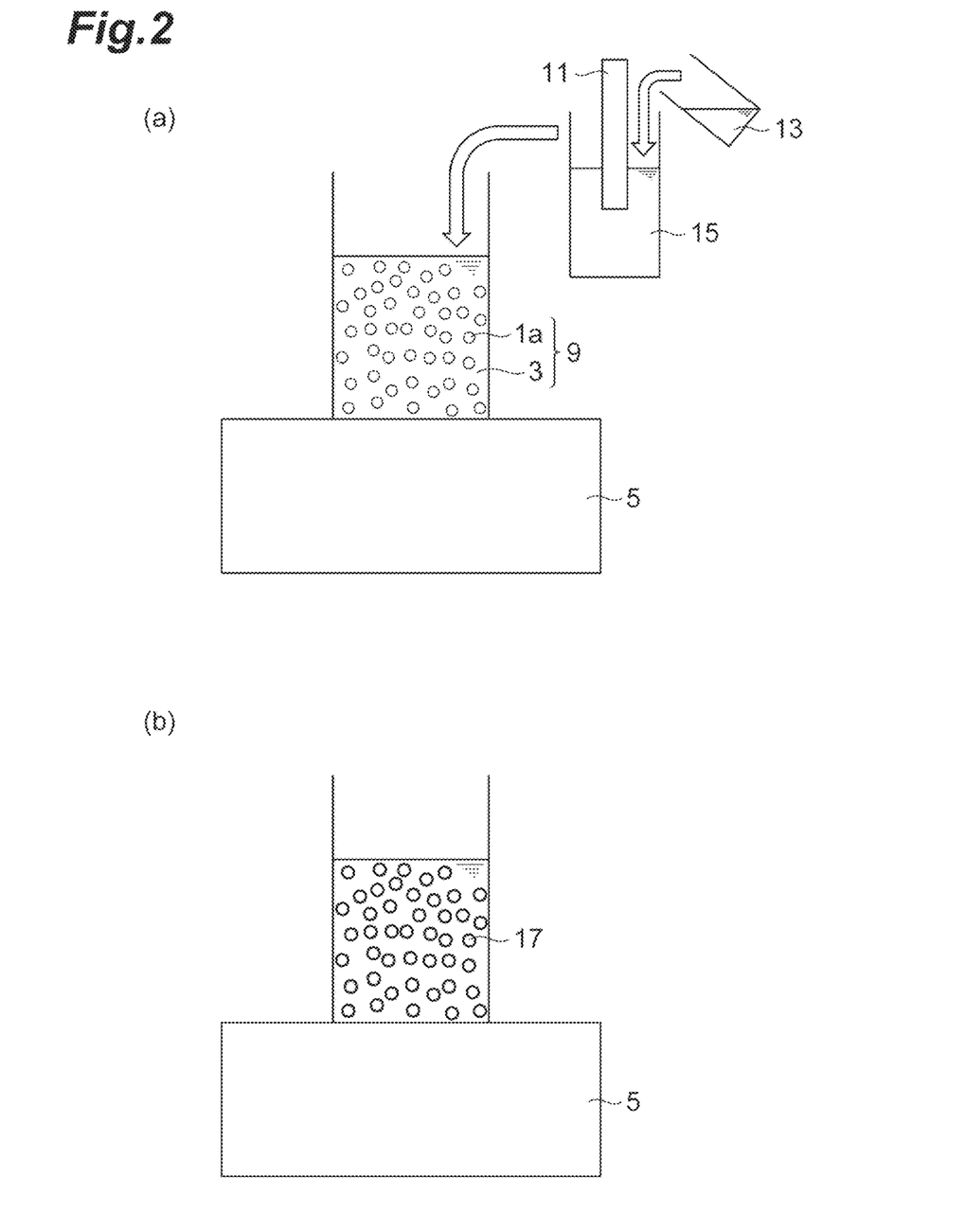
FIG. 2 is a drawing for describing a method for producing a sugar alcohol microcapsule according to one embodiment of the present invention.

The dispersing means 11 is not particularly limited as long as the film formation material 13 can be dispersed or dissolved in the liquid 15, and examples of the general method include a mixer, a magnetic stirrer, a colloid mill, a homomixer, an ultrasonic homogenizer, and a micro channel device. The dispersing means is preferably a magnetic stirrer, a homomixer, and an ultrasonic homogenizer from the viewpoint of allowing easy emulsification.

As the liquid 15 in which the film formation material 13 is dispersed or dissolved, the dispersion medium or the like used as the dispersion medium 3 can be used.

A silane coupling agent may be used for the purpose of improving the dispersibility of the generated microcapsules. Specific examples of the silane coupling agent include vinyltrimethoxysilane, vinyltriethoxysilane, 3-glycidoxypropyl trimethoxysilane, 3-glycidoxypropyl triethoxysilane, p-styryl trimethoxysilane, 3-methacryloxypropyl trimethoxysilane, 3-methacryloxypropyl triethoxysilane, 3-acryloxypropyl trimethoxysilane, N-2-(aminoethyl)-3-aminopropyl trimethoxysilane, 3-aminopropyl triethoxysilane, 3-aminopropyl trimethoxysilane, 3-isocyanatepropyl triethoxysilane, methyltrimethoxysilane, phenyltriethoxysilane, and hexamethyl disilazane, and a coupling treatment may be performed by a wet treatment or a dry treatment. For example, by performing the coupling treatment using hexamethyl disilazane, the dispersibility of the particles is improved, and furthermore, hydrophobicity is applied to the particles to improve the water resistance of the particles.

The sugar alcohol microcapsule according to the present embodiment comprises the sugar alcohol as the core substance, and the covering layer covering the core substance. As described above, the covering layer is obtained by the reaction between the sugar alcohol and the material that can react with the sugar alcohol to be encapsulated, or the reaction between the component contained in the sugar alcohol particles and the material that reacts with such component.

The shape of the sugar alcohol microcapsule according to the present embodiment may be any of a spherical shape, a spherical shape having a partial defect, and a non-spherical shape, and is preferably a spherical shape. Regarding the shape (size) of the sugar alcohol microcapsule, the value of the minimum diameter obtained under measurement so that a particle image observed with an optical microscope is sandwiched between parallel lines is preferably 70% or more of the value of the maximum diameter. Examples of the non-spherical particles include ellipsoidal particles having a tire profile of 0.2 or more; crushed particles; and particles having a shape in which a spherical surface accounts for less than 50% of the whole surface area of the particles.

The average particle diameter of the sugar alcohol microcapsule according to the present embodiment is preferably 100 μm or less, more preferably 80 μm or less, and particularly preferably 60 μm or less. The average particle diameter of the sugar alcohol microcapsule can be measured with a laser light diffracting-scattering technique particle size distribution measuring device, for example.

The amount of moisture contained in the sugar alcohol microcapsule according to the present embodiment is preferably less than 1% by mass. The amount of moisture of the sugar alcohol microcapsule can be measured with, for example, a Karl Fischer moisture titrator.

[Slurry and Method for Producing the Same]

A slurry according to the present embodiment comprises the sugar alcohol microcapsule obtained by the method for producing the sugar alcohol microcapsule according to the present embodiment. A method for producing a slurry according to the present embodiment comprises a step of mixing a sugar alcohol microcapsule obtained by the method for producing the sugar alcohol microcapsule according to the present embodiment with a dispersion medium to obtain the slurry, for example. The slurry according to the present embodiment may be obtained in a process in which the sugar alcohol microcapsule is obtained by the method for producing the sugar alcohol microcapsule according to the present embodiment, for example, it is a liquid containing the sugar alcohol microcapsule 17 shown in FIG. 2(b).

[Resin Molded Article and Method for Producing the Same]

A resin molded article according to the present embodiment is produced using the sugar alcohol microcapsule obtained by the method for producing the sugar alcohol microcapsule according to the present embodiment. The method for producing the resin molded article according to the present embodiment comprises a step of producing the resin molded article using the sugar alcohol microcapsule obtained by the method for producing the sugar alcohol microcapsule according to the present embodiment. The resin molded article according to the present embodiment contains the sugar alcohol microcapsule, and can be obtained by molding a thermosetting resin or a thermoplastic resin. Specific examples of the thermosetting resin include a phenol resin, an epoxy resin, a urea resin, a melamine resin, unsaturated polyester, a silicon resin, and polyurethane. Examples of the thermoplastic resin include vinyl chloride, polyethylene, polypropylene, polystyrene, an acrylic resin, nylon, and polycarbonate.

EXAMPLES

Hereinafter, the present invention will be further described with reference to Examples, but the present invention is not limited thereto.

<Production of Microcapsule>

Example 1

5 g of xylitol and 0.1 g of polyvinyl alcohol (manufactured by Wako Pure Chemical Industries, Ltd., average degree of polymerization: 1500) were placed in a 100-mL tall beaker and 30 g of a silicone oil (KF-96-100cs manufactured by Shin-Etsu Chemical Co., Ltd., viscosity: 100 cs (25° C.)) was placed in a 300-mL beaker, followed by separately heating these at 155° C. by a hot stirrer, thereby providing molten xylitol. An emulsion in which molten xylitol fine droplets were dispersed in the silicone oil was obtained by moving the silicone oil to the 100-mL tall beaker in which the molten xylitol was held, followed by stirring at 1200 rpm for 10 minutes. Slowly-cooling was performed at room temperature during continuous stirring to decrease the temperature of the emulsion to 100° C., and an ultrasonic wave was then applied at an output of 50 W for 5 minutes by an ultrasonic homogenizer, to generate spherical xylitol fine particles refined into 100 μm or less. An emulsion prepared by placing 2.5 g of ethyl-2-cyanoacrylate (manufactured by Wako Pure Chemical Industries, Ltd.) and 15 g of a silicone oil in a 100-mL beaker, followed by stirring at 800 rpm for 10 minutes was placed in the liquid containing the xylitol fine particles. Therefore, ethyl-2-cyanoacrylate was brought into contact with the xylitol fine particles dispersed in the silicone oil to start the polymerization reaction and form a film on the surface of the fine particles, thereby obtaining a microcapsule including the xylitol fine particles.

Example 2

A capsule including erythritol was obtained in the same procedures as those of Example 1 except that xylitol of Example 1 was changed to erythritol.

Example 3

A capsule including xylitol was generated in the same procedures as those of Example 1 except that the treatment conditions of the ultrasonic homogenizer of Example 1 were changed to application at an output of 50 W for 1 minute.

Example 4

4 g of erythritol, 0.2 g of benzyl trimethylammonium chloride (manufactured by Wako Pure Chemical Industries, Ltd.), and 1.0 g of hexamethylendiamine (manufactured by Wako Pure Chemical Industries, Ltd.) were placed in a 100-mL flask under a nitrogen atmosphere, and heated at 155° C. in an oil bath to provide molten hexamethylendiamine-containing erythritol. 50 g of a silicone oil was placed in a 300-mL beaker, and heated at 155° C. by a hot stirrer. Subsequently, hexamethylendiamine-containing erythritol fine particles were generated by the same operations as those of Example 1. A solution prepared by placing 1.0 g of diphenylmethane diisocyanate: millionate MR-200 (manufactured by Nippon Polyurethane Industry Co., Ltd., isocyanate content: 30.7% by mass) and 15 g of a silicone oil in a 100-mL beaker, and thereafter stirring at 800 rpm for 10 minutes was placed in the liquid containing the above-mentioned erythritol fine particles. Therefore, diphenylmethanediisocyanate was brought into contact with hexamethylendiamine dispersed in erythritol to advance the reaction and form a film on the surface of the fine particles, thereby obtaining a microcapsule including erythritol.

Example 5

0.5 g of threitol, 0.02 g of benzyl trimethylammonium chloride, and 0.06 g of hexamethylendiamine were placed in a 100-mL flask under a nitrogen atmosphere, and heated at 120° C. in an oil bath to provide molten hexamethylendiamine-containing threitol. 50 g of a silicone oil was placed in a 300-mL beaker, and heated at 120° C. by a hot stirrer. Subsequently, hexamethylendiamine-containing threitol fine particles were generated by the same operations as those of Example 1. A solution prepared by placing 0.18 g of a bisphenol F type epoxy resin: Ep-806 (manufactured by Mitsubishi Chemical Corporation, epoxy equivalent: 165 g/eq) and 15 g of a silicone oil in a 100-mL beaker, and thereafter stirring at 800 rpm for 10 minutes was placed in the liquid containing the above-mentioned threitol fine particles. Therefore, Ep-806 was brought into contact with hexamethylendiamine dispersed in threitol to advance the reaction and form a film on the surface of the fine particles, thereby obtaining a microcapsule including threitol.

Example 6

A microcapsule including xylitol was obtained in the same procedures as those of Example 1 except that the ultrasonic homogenizer of Example 1 was changed to a hot stirrer, and stirring was performed at 1200 rpm.

Comparative Example 1

An emulsion solution in which xylitol aqueous solution fine droplets were dispersed in a silicone oil was generated by placing 4 g of a 50% by mass xylitol aqueous solution and 30 g of a silicone oil (manufactured by Shin-Etsu Silicone Co., Ltd., viscosity: 100 cs (25° C.)) in a 300-mL beaker, heating at 80° C. by a hot stirrer, stirring at 1200 rpm for 10 minutes, and applying an ultrasonic wave at an output of 50 W for 5 minutes by an ultrasonic homogenizer. An emulsion prepared by placing 2.5 g of ethyl-2-cyanoacrylate (manufactured by Wako Pure Chemical Industries, Ltd.) and 15 g of a silicone oil in a 100-mL beaker, and thereafter stirring at 800 rpm for 10 minutes was placed in the above-mentioned emulsion solution while being stirred at 1200 rpm at 80° C. by a hot stirrer. Therefore, ethyl-2-cyanoacrylate was brought into contact with the xylitol aqueous solution emulsion dispersed in the silicone oil to start the polymerization reaction and form a film on the surface of the fine particles, thereby obtaining a microcapsule including the xylitol fine particles.

<Evaluation>

Figure 3:
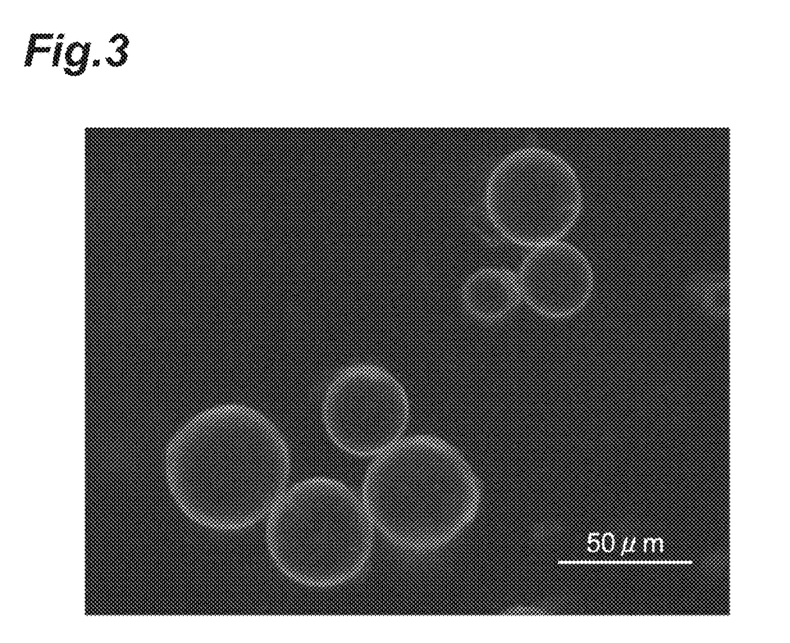
FIG. 3 is an optical microscope image of a microcapsule including xylitol fine particles in Example 1.

The optical microscope image of the microcapsule including the xylitol fine particles generated according to Example 1 is shown in FIG. 3. As shown in FIG. 3, the production of the microcapsule including the xylitol fine particles was confirmed.

Average particle diameters, defects of capsule films, particle shapes, amounts of heat storage, and amounts of moisture were measured and evaluated by the following methods using the microcapsules obtained in Examples and Comparative Examples. The evaluation results are shown in Table 1.

(1) Evaluation of Average Particle Diameter

In particle size distribution denoted by measuring at a transmission mode, a particle refractive index: 1.46, a solvent refractive index: 1.40, volumetric basis, a measuring time: 30 seconds, and number of times for measurement: 3 under a room temperature (18 to 25° C.) condition by a laser light diffracting-scattering technique particle size distribution measuring device (manufactured by NIKKISO CO., LTD., micro track particle size distribution meter MT-3000EXII, circulating solvent: methyl isobutyl ketone, light source: semiconductor laser 780 nm) using a solution obtained by diluting 0.2 mL of the generated microcapsule dispersion solution with 1 mL of methyl isobutyl ketone, a particle diameter providing cumulative distribution of 50% (D50) was defined as an average particle diameter.

(2) Evaluation of Defect of Microcapsule Film

The results of the average particle diameter evaluated in the above (1) were compared with the results measured after circulating 20 vol % methanol-containing methyl isobutyl ketone as the circulating solvent in a device for 1 minute or more, and the heat storage material in the microcapsule was determined to be eluted to the circulating solvent when the number of detection of the particles was less than 80% of the above (1) or the average particle diameter was changed by ±50% or more to evaluate the case as "defect". The case where it remains unchanged was evaluated as "no defect".

(3) Evaluation of Particle Shape

The generated microcapsule dispersion solution was extracted on slide glass. Observation was performed with an optical microscope (manufactured by Keyence Corporation, digital microscope VHX-1000), and the particle diameter of the particle image of a spherical body or particle image of a shape where a part of spherical body was missing was measured using parallel lines. A diameter in which the width of the parallel lines for one particle was maximized was defined as a maximum diameter; a diameter in which the width was minimized was defined as a minimum diameter; a particle in which the value of the minimum diameter was 70% or more of the value of the maximum diameter was determined to be a spherical particle; and a particle in which the value was less than 70% was determined to be a non-spherical particle. Arbitrary ten particles were measured for the generated one sample, and the particle shape was evaluated as a "spherical shape" if the non-spherical particles were not present.

(4) Evaluation of Amount of Heat Storage

The generated microcapsule was collected by filtration under reduced pressure using a quantitative analysis filter paper No. 5c (manufactured by ADVANTEC), KIRIYAMA ROHTO (manufactured by Kiriyama Glass, Co.), and a vacuum pump. The microcapsule was washed and air-dried using 50 mL of toluene, and sealed and stored in a glass container filled with nitrogen. The amount of absorption of heat at about the melting point (about ±10° C. of the melting point of the heat storage material) of the heat storage material measured when the temperature of a sample having a sample amount of 2.5 mg was increased at a temperature increase rate of 5° C./minute to 150° C. was calculated by a differential thermal calorimeter (Q200 type manufactured by TA Instruments) using the collected dried microcapsule. A value denoted by (amount of absorption of heat of microcapsule)/(amount of absorption of heat of raw material of heat storage material)×100 was defined as an amount of heat storage (%).

(5) Evaluation of Amount of Moisture

The generated microcapsule was collected by filtration under reduced pressure using a quantitative analysis filter paper No. 5c (manufactured by ADVANTEC), KIRIYAMA ROHTO (manufactured by Kiriyama Glass, Co.), and a vacuum pump. The microcapsule was washed and air-dried using 50 mL of toluene, and sealed and stored in a glass container filled with nitrogen. The collected dried microcapsule was brayed in an agate mortar, to produce a measurement sample. The amount of moisture of the measurement sample was measured with a moisture vaporization apparatus (ADP-611 manufactured by Kyoto Electronics Manufacturing Co., Ltd.) and a Karl Fischer moisture titrator (MKC-610 manufactured by Kyoto Electronics Manufacturing Co., Ltd.) to obtain the percentage of the amount of moisture contained in the microcapsule as an amount of moisture (% by mass). The moisture of the measurement sample was vaporized in a sample amount: 5 g, a heating temperature: 150° C., carrier gas: nitrogen, and carrier gas flow: 200 mL/min. Moisture measurement was performed based on the generated gas with a place having a terminal point potential of 200 mV as a terminal point using a coulometric method moisture measurement reagent KEMAQUA anolyte AGE (manufactured by Kyoto Electronics Manufacturing Co., Ltd.) and a coulometric method moisture measurement reagent KEMAQUA catholyte CGE (manufactured by Kyoto Electronics Manufacturing Co., Ltd.). The amount of moisture (% by mass) was calculated from the measured amount of moisture (g), and the sample amount (g) used for measurement.

heat storage material, and therefore, heat energy is anticipated to be transportable by the sugar alcohol microcapsule of the present invention. Thereby, it is possible to transport heat to facilities having large heat demand such as a building, a hospital, and a school from large-scale exhaust heat sources such as a power plant and a factory. It is considered to be also usable as a heat medium that can recover the exhaust heat of a household level water heater or the exhaust heat of a movable body such as an automobile.

TABLE 1

| | Item | Example 1 | Example 2 | Example 3 | Example 4 | Example 5 | Example 6 | Comparative Example 1 |
|---|---|---|---|---|---|---|---|---|
| Material | Sugar alcohol | Xylitol | Erythritol | Xylitol | Erythritol | Threitol | Xylitol | Xylitol aqueous solution |
| | Reactant additive | NA | NA | NA | HMDA[1] | HMDA[1] | NA | NA |
| | Film formation material | E2CA[2] | E2CA[2] | E2CA[2] | MR-200 | Ep-806 | E2CA[2] | E2CA[2] |
| Additive | Viscosity modifier | PVA[3] | PVA[3] | PVA[3] | NA | NA | PVA[3] | NA |
| | Surfactant | NA | NA | NA | BnMe$_3$NH$_4$Cl[4] | BnMe$_3$NH$_4$Cl[4] | NA | NA |
| Dissolution condition | Temperature (° C.) | 155 | 155 | 155 | 155 | 120 | 155 | 80 |
| Ultrasonic wave microparticulating condition | Application start temperature (° C.) | 100 | 100 | 100 | 100 | 100 | NA | 80 |
| | Output (W) | 50 | 50 | 50 | 50 | 50 | NA | 50 |
| | Application time (min) | 5 | 5 | 1 | 5 | 5 | NA | 5 |
| Polymerizing condition | Temperature (° C.) | 80 | 80 | 80 | 60 | 70 | 80 | 80 |
| | Time (minute) | 3 | 3 | 3 | 3 | 5 | 3 | 3 |
| Evaluation results | Average particle diameter (μm) | 60 | 60 | 70 | 80 | 70 | 120 | 80 |
| | Capsule film defect | NA | NA | NA | NA | NA | NA | NA |
| | Shape | Spherical shape | Spherical shape | Spherical shape | Spherical shape | Spherical shape | Non-spherical shape | Spherical shape |
| | Amount of heat storage (%) | 88 | 90 | 92 | 82 | 82 | 86 | 52 |
| | Amount of moisture (% by mass) | <1 | <1 | <1 | <1 | <1 | <1 | 30 |

The notes of Table 1 mean the followings.

1): hexamethylendiamine

2): ethyl-2-cyanoacrylate

3): polyvinyl alcohol (average degree of polymerization: 1500)

4): benzyl trimethylammonium chloride

As is apparent from Table 1, in Examples, the both the amount of heat storage and the amount of moisture are excellent, by contrast, in Comparative Example, both the amount of heat storage and the amount of moisture are poor.

INDUSTRIAL APPLICABILITY

The sugar alcohol encapsulated in the present invention is used for an encapsulating material or the like of a heat storage tank, and most past heat storage tanks are of stationary types such as a type in which a heat medium passes through the circumference of a metal cartridge including a heat storage material internally encapsulated, and a type in which a heat exchanger is inserted into the inside of a block

REFERENCE SIGNS LIST

1: melt of sugar alcohol, 1a: sugar alcohol fine particles, 3: dispersion medium, 5: heating means, 7: microparticulating means, 9: mixed solution, 11: dispersing means, 13: film formation material, 15: liquid, 17: sugar alcohol microcapsule.

The invention claimed is:

1. A production method for a sugar alcohol microcapsule, comprising: obtaining a sugar alcohol microcapsule by mixing particles that include molten sugar alcohol and are dispersed in an oil phase with a material that reacts with the particles, and encapsulating the sugar alcohol.

2. The production method according to claim 1, wherein an amount of moisture included in the microcapsule is less than 1% by mass with respect to a total of the sugar alcohol microcapsule.

3. The production method according to claim 1, wherein the material that reacts with the particles is at least one selected from the group consisting of a cyanoacrylate compound, a cyanate compound, an isocyanate compound, and a carboxylic halide.

4. The production method according to claim 1, wherein the particles further include at least one selected from the group consisting of an amine compound and a water-soluble epoxy compound.

5. The production method according to claim 1, wherein an average particle diameter of the sugar alcohol microcapsule is 100 μm or less.

6. The production method according to claim 1, wherein the particles are dispersed in the oil phase using an ultrasonic homogenizer.

* * * * *